3,812,097
AMMONIUM SALTS OF 3β-{(2-O-β-D-GLUCOPY-RANURONOSYL-α-D-GLUCOPYRANURONOSYL) OXY} OLEAN-12-EN-30-OIC ACID
John S. Baran, Morton Grove, and Barnett S. Pitzele, Skokie, Ill., assignors to G. D. Searle & Co., Chicago, Ill.
No Drawing. Filed July 17, 1972, Ser. No. 272,329
Int. Cl. C07c 47/18
U.S. Cl. 260—210 R                4 Claims

ABSTRACT OF THE DISCLOSURE

Ammonium salts of 3β-{(2-O-β-D-glucopyranuronsyl-α-D-glucopyranuronosyl)oxy} olean-12-en-30-oic acid herein described have potent antiarrhythmic activity and they are also useful sweetening agents. These substances are prepared from the monoammonium salt of 3β-{(2-O-β-D-glucopyranuronosyl-α-D-glucopyranuronosyl)oxy} olean-11-oxo-12-en-30-oic acid by conversion of the 11-oxo function to an 11-methylene function. The reduction is followed by replacement of the carboxylic acid hydrogens with the ammonium ion under appropriate condition to provide hydrated ammonium salts. Alternately, the reduced monoammonium salt is acidified to form the triacid. The triacid is then made anhydrous and converted to the anhydrous mono, di, and tri-ammonium salts.

This invention relates to ammonium salts of 3β-{(2-O-β-D-glucopyranuronosyl-α-D-glucopyranuronosyl)oxy} olean-12-en-30-oic acid which are new, unobvious, and useful chemical compounds of the formula

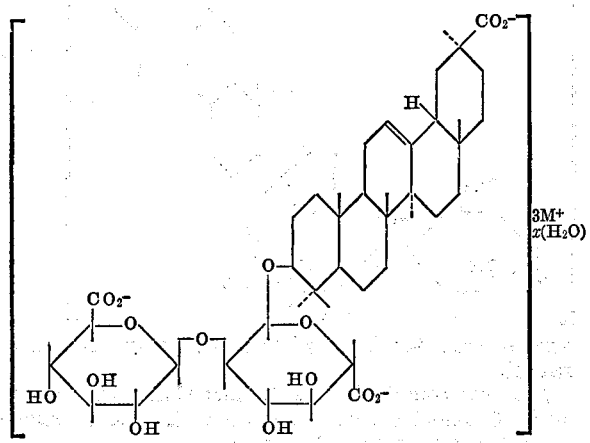

wherein each $M^+$ is a hydrogen ion or an ammonium radical and $x=0, 1, 2, 3$.

The instant compounds have valuable pharmacological properties. They are, for example, antiarrhythmic agents and possess the advantage of diminished desoxycorticosterone acetate-like activity. In addition, these compounds are potent sweetening agents.

The present compounds are the ammonium salts of 11-deoxyglycyrrhizic acid. The naturally occurring precursor, glycyrrhizic acid (glycyrrhizin) is a substance extracted from licorice root, *Glycyrrhiza glabra*. The monoammonium salt of glycyrrhizin is used as a sweetening agent, both alone and in conjunction with sucrose (U.S. Pat. 3,282,706 and M. Cook, The Flavor Industry, December (1970), p. 831). Glycyrrhizin is useful in the treatment of Addison's disease {A. Willebrand and C. Kamminga, New Engl. J. Med., 244, 471 (1951)} and also possesses antiarthritic activity {M. Gujral et al., Indian J. Med. Sci., 15, 625 (1961)}. The ammonium salts of the naturally occurring 11-keto precursors to the compounds of the present invention lack the antiarrhythmic activity characteristic of the latter substances.

The compounds of the present invention are about 150 times sweeter than sucrose on a parts-by-weight basis.

The antiarryhythmic utility of the instant compounds is evident from the results of a standardized test designed to detect the capacity of compounds to slow the ventricular tachycardia induced by aconitine in the isolated rabbit heart. The procedure for determining antiarrhythmic activity is essentially the same as that described by Lucchesi {J. Pharmacol. Exp. Therap., 137, 291 (1962)}. Hearts are obtained from adult albino rabbits of either sex and perfused in apparatus modeled after that devised by Anderson and Craver {J. Pharmacol. Exp. Therap., 93, 135 (1948)}. The composition of the perfusion solution is the same as that of Lucchesi, but the volume is increased to 200 ml. and the temperature lowered to 28°. Aconitine (ordinarily as the nitrate) is administered as soon as the heart beat is regular and the EKG pattern normal, the dose being so selected as to at least double the rate. Typically, 0.05 ml. of 0.1% aconitine nitrate in physiological saline is injected. EKG's are recorded at five minute intervals after the onset ventricular tacchycardia until two successive readings show stabilization of the rate. The perfusate collected during this time is discarded and is replaced with fresh solution q.s. 200 ml. Promptly following stabilization, 2 mg. of compound dissolved or suspended in 1 ml. of physiological saline, is mixed with the perfusion solution. Ten minutes later a like amount is introduced, followed after a further ten minutes by double the first amount. Final concentration of compound in the perfusion solution is thus 40 mg./l. Recording of EKG's is continued at five minute intervals throughout this time and for ten minutes thereafter. A compound is considered antiarrythmic if, at any time during the 30 minutes immediately following initial administration in at least half of a minimum of two tests, it reduced by 50% or more the rate recorded ten minutes after onset of tachycardia. Ammoniated glycyrrhizin derivatives, in contrast with the compounds of this invention, do not show antiarrythmic activity.

The anhydrous salts are prepared by converting the monoammonium-11-deoxo-glycyrrhizate to the 11-deoxoglycyrrhizic acid by crystallizing the former from hot acetic acid and desiccating the free acid over phosphorus pentoxide at high vacuum at room temperature for two days. 11-deoxo-glycyrrhizic acid is converted to the anhydrous triammonium-11-deoxo-glycyrrhizate by dissolving this anhydrous acid in liquid ammonia. The liquid ammonia is then removed at room temperature. The mono- and diammonium salts of 11-deoxo-glycyrrhizic acid are prepared by placing the anhydrous acid in difluorodichloromethane and then adding a respective stoichiometric amount of liquid ammonia. The mixture is shaken in a sealed vessel for 48 hours and the solvent is removed to provide the respective anhydrous mono- or di-ammonium salt.

The following examples describe in detail compounds illustrative of the present invention and methods for their preparation. Throughout the examples hereinbefore set forth; temperatures are given in degrees centigrade, pressures in millimeters of mercury, and relative amounts of materials in parts by weight except as otherwise noted. These examples should not be construed as limiting the invention either in spirit or in scope.

EXAMPLE 1

Five parts of monoammonium glycyrrhizate (Mac-Andrews-Forbes Co., Camden, N.J.) is dissolved in 200 parts by volume of glacial acetic acid and 35 parts by volume of water. 1.5 parts of pre-reduced platinum oxide catalyst is added and reduction is conducted in a closed container in a hydrogen atmosphere at room temperature until 0.012 parts of hydrogen react. The reaction mixture is filtered and the catalyst is washed with a 1:1 mixture of ethanol and chloroform. The solvents are removed by evaporation under reduced pressure at 40°. The residual solvent is removed under high vacuum at room temperature. The product is the trihydrated ammonium salt of 3β-{(2-O-β-D-glucopyranuronosyl-2-D-glucopyranuronosyl)oxy} olean-12-en-30-oic acid alternately named monoammonium 11-deoxoglycyrrhizate trihydrate. This compound is represented by the following formula:

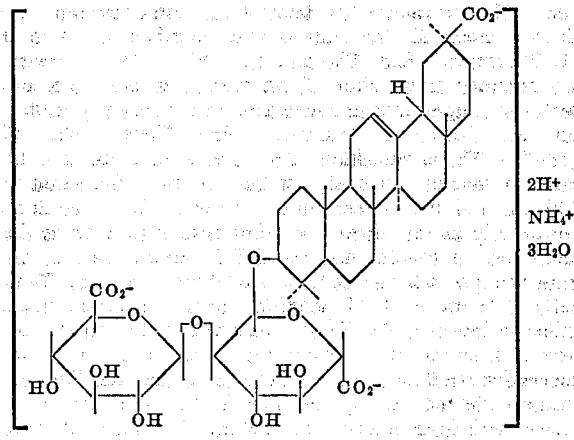

EXAMPLE 2

Monoammonium-11-deoxoglycyrrhizate trihydrate of Example 1 is crystallized from hot acetic acid. The product is 11-deoxoglycyrrhizic acid trihydrate. 100 parts of the free acid trihydrate is suspended in 20,000 parts by volume of water and 18.4 parts of ammonium bicarbonate is added. The suspension is mixed for 3.5 hours and 8000 parts by volume of methanol is then added. This causes the suspension to dissolve. The solution is mixed for 1.5 hours, then concentrated by evaporation at reduced pressure. The residual material is successively dissolved and concentrated in ethanol and t-butyl alcohol. The remaining material is dried in a vacuum desiccator for 4 days and the product is the dihydrated diammonium salt of 3β-{(2-O-β-D-glucopyranuronosyl-α-D-glucopyranuronosyl)oxy} olean-12-en-30-oic acid alternately named diammonium-11-deoxoglycyrrhizate dihydrate. This compound is represented by the following formula:

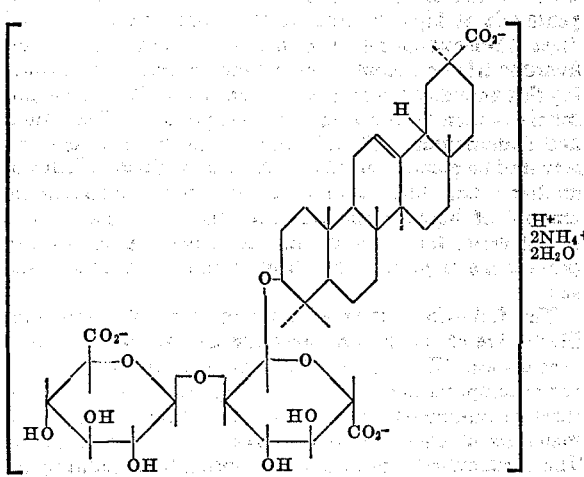

EXAMPLE 3

Four parts of monoammonium-11-deoxoglycyrrhizote trihydrate is dissolved in 40 parts by volume of concentrated ammonium hydroxide. The homogeneous solution is allowed to stand for six hours. The solution is then concentrated to a thick syrup by evaporation at reduced pressure, keeping the temperature of the evaporating solution at or below 30° C.

The syrup is desiccated in a stream of nitrogen. Residual solvent is removed by pumping the desiccator chamber for four days with a vacuum pump. The product is trihydrated triammonium salt of 3β-{(2-O-β-D-glucopyranuronosyl-α-D-glucopyranuronosyl)oxy} olean - 12-en-30-oic acid alternately named triammonium-11-deoxoglycyrrhizate trihydrate. This compound is represented by the following formula:

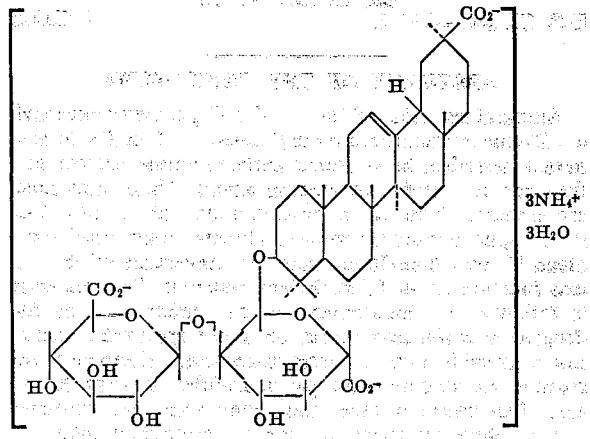

What is claimed is:

1. A compound of the formula

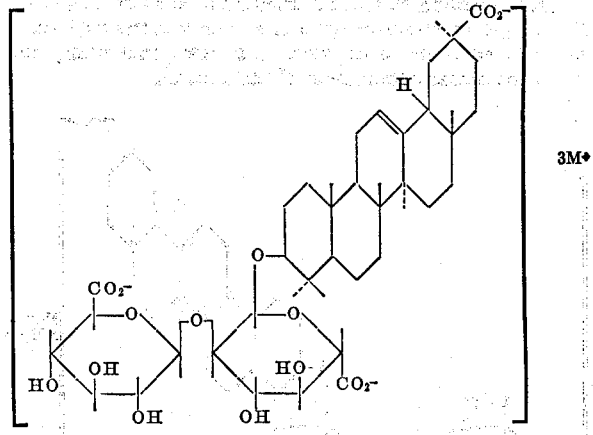

wherein each $M^+$ is a hydrogen ion or an ammonium radical.

2. A compound which is the monoammonium salt of 3β-{(2-O-β-D-glucopyranuronosyl - α - D - glucopyranuronosyl)oxy} olean-12-en-30-oic acid.

3. A compound which is the diammonium salt of 3β-{(2-O-β-D-glucopyranuronosyl - α - D - glucopyranuronosyl)oxy} olean-12-en-30-oic acid.

4. A compound according to claim 1, which is the triammonium salt of 3β-{(2-O-β-D-glucopyranuronosyl-α-D-glucopyranuronosyl)oxy} olean-12-en-30-oic acid.

References Cited

UNITED STATES PATENTS 3,442,911  5/1969  Baxendale _____ 260—210 R
3,732,202  5/1973  Jewers et al. _____ 260—210 R JOHNNIE R. BROWN, Primary Examiner U.S. Cl. X.R.

99—141 R; 424—180